Sept. 24, 1929.  J. MORTKA  1,729,226
VEHICLE BRAKE
Filed July 10, 1928    3 Sheets-Sheet 1

INVENTOR.
John Mortka

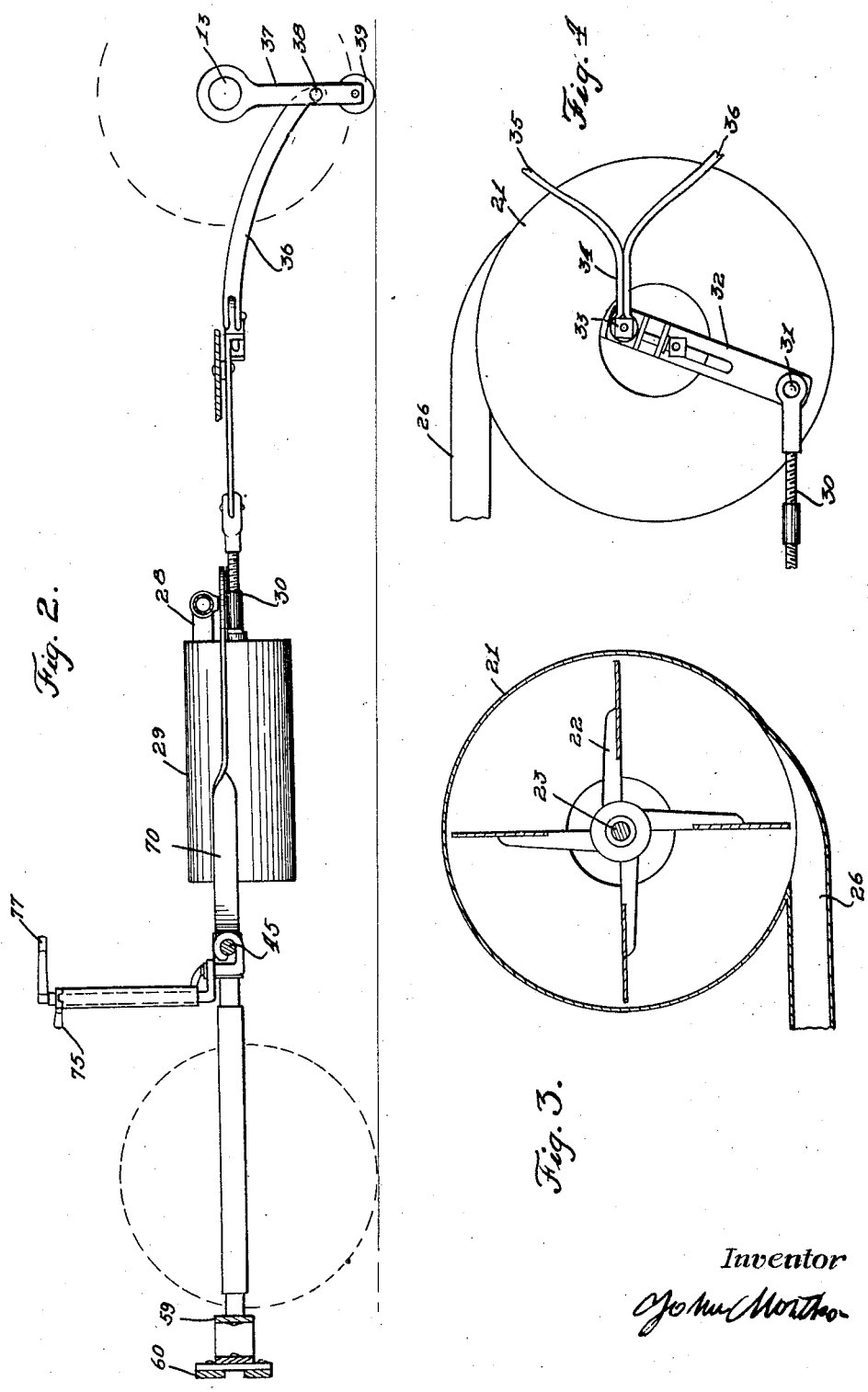

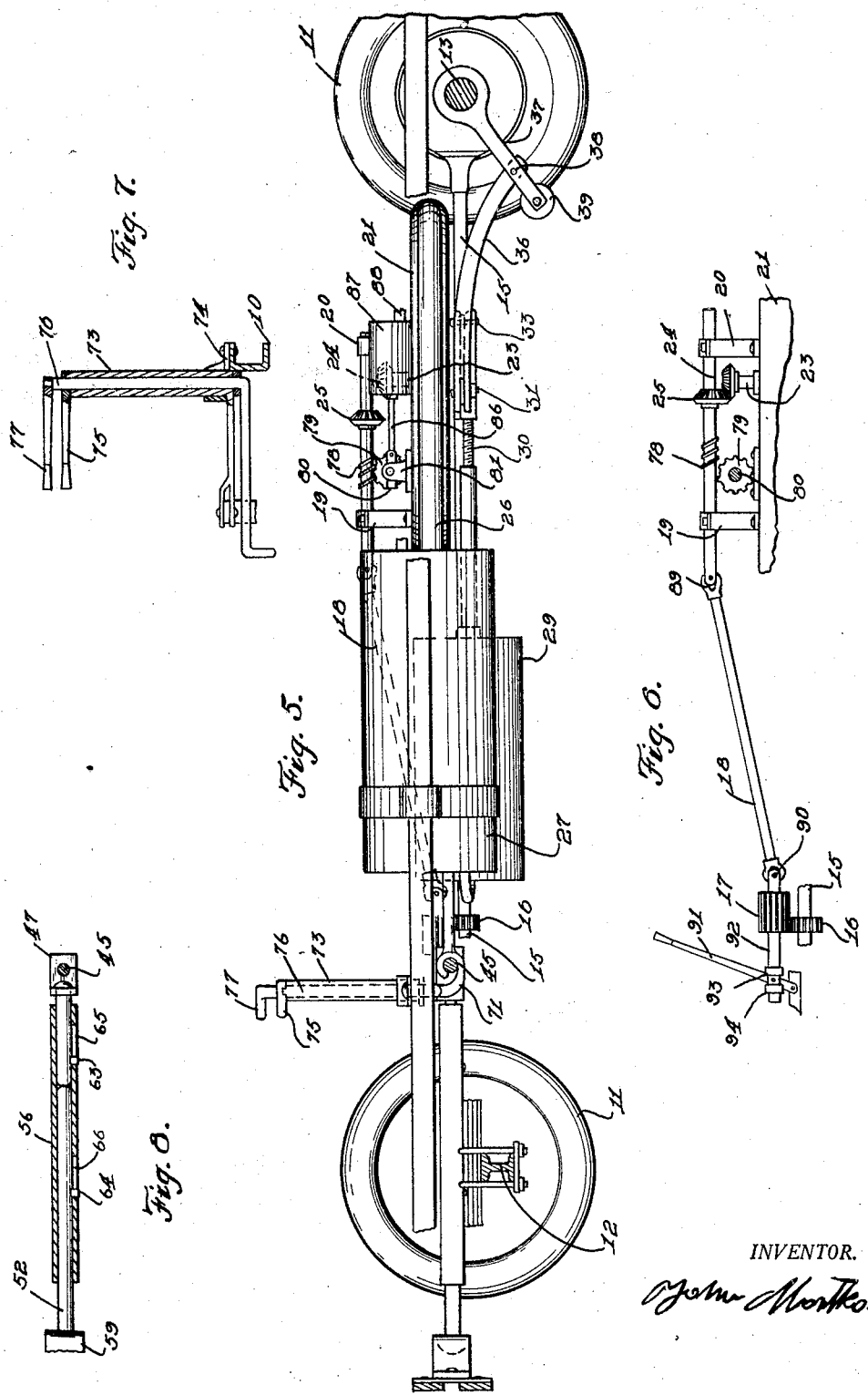

Patented Sept. 24, 1929

1,729,226

UNITED STATES PATENT OFFICE

JOHN MORTKA, OF BROOKLYN, NEW YORK

VEHICLE BRAKE

Application filed July 10, 1928. Serial No. 291,576.

This invention relates to improvements in automobiles or the like motor-operated vehicles, and it is the principal object of my invention to provide a braking device for such vehicles which is either operated in the usual manner by the operation of suitable levers through the intermediary of a compressed air operated piston, or which is actuated by the fender in case the same strikes an obstacle in the path of the automobile.

Another object of my invention is the provision of a braking device for automobiles generating its own compressed air for the operation of the brake setting and releasing piston.

A further object of my invention is the provision of an automobile brake lifting the driving rear wheels from the ground either automatically if the fender of the car meets an obstruction or by the proper manipulation of a hand lever.

A still further object of my invention is the provision of a braking system for automobiles adapted to be operated by compressed air generated during the operation of the motor shaft.

These and other objects and advantages of my invention will become more fully apparent as the description thereof proceeds, and will then be more specifically defined in the appended claims.

In the accompanying drawings forming a material part of this disclosure:—

Fig. 2 is a sectional side elevation of a compressed-air cylinder and co-operating parts of the braking device.

Fig. 3 is a sectional top plan view of the frame in its casing after removal of its cover.

Fig. 4 is a bottom plan view of the frame casing and co-operating parts.

Fig. 5 is a sectional side elevation of a compressed air-tank and its co-operating brake parts.

Fig. 6 is a detail side elevation of the frame operating mechanism.

Fig. 7 is a sectional detail view of the operating mechanism.

Fig. 8 is a sectional detail view of fender operated bars.

Figure 1:
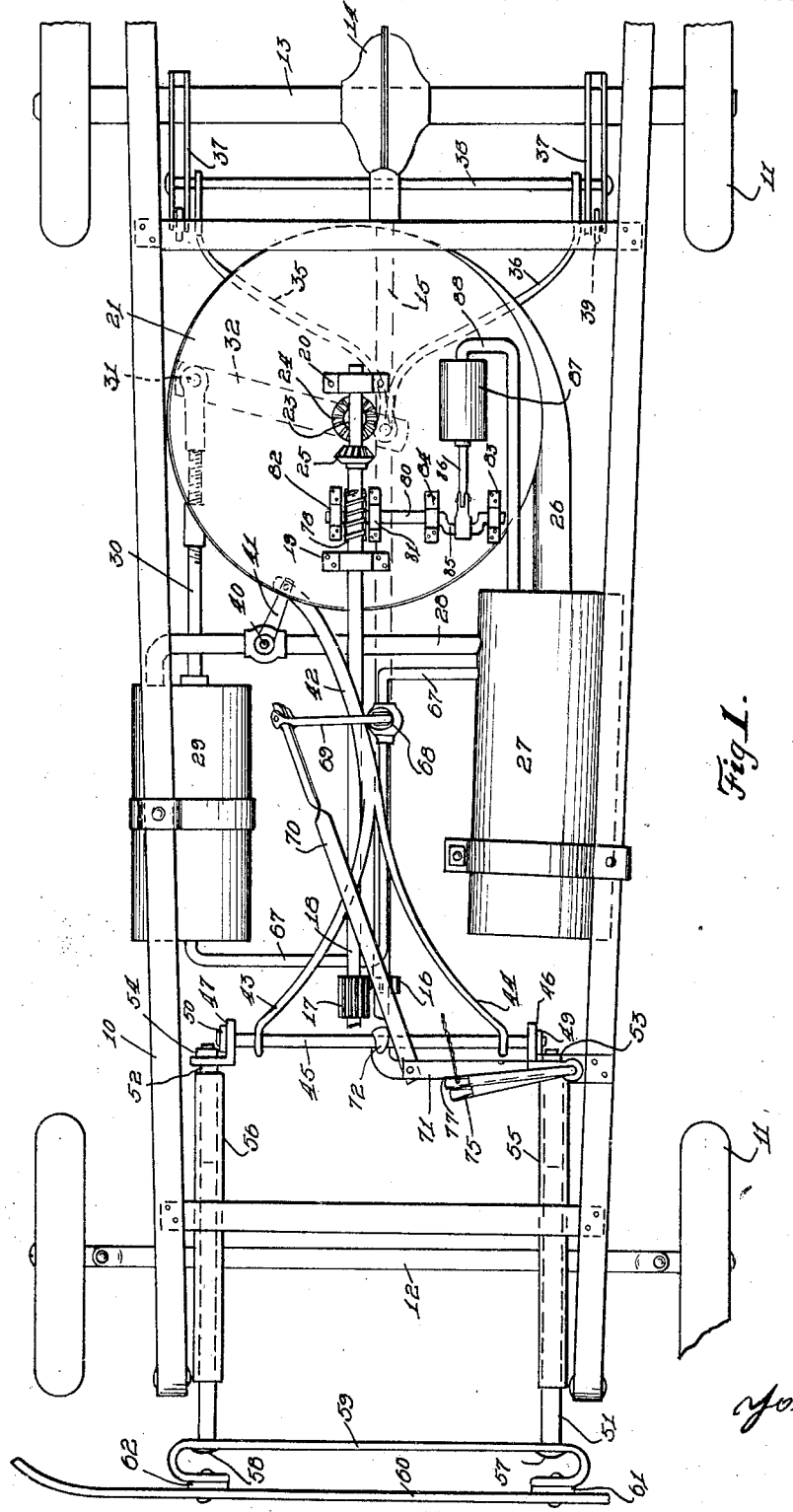
Fig. 1 is a top plan view on an automobile chassis or frame equipped with a braking device constructed according to my invention.

As illustrated, the chassis or frame 10 of an automobile is resting on wheels 11 at the ends of the front axle 12 and divided rear axle 13 with the usual differential gear in casing 14 adapted to be operated from the motor shaft 15 in the customary well known manner. This shaft 15 carries near its forward end a gear 16 adapted to mesh with a gear 17 on a shaft 18 journaled in suitable bearings 19, 20 on top of a frame casing 21. In this casing a fan 22 having a plurality of blades of any suitable construction is revolving on a shaft 23 extending to the outside of the casing on its upper face. This shaft carries on its outer end a bevel gear 24 in mesh with a bevel gear 25 on shaft 18. An air duct 26 leads from the frame casing into a compressed air tank 27 strapped or otherwise secured to the automobile frame 10. A pipe or conduit 28 leads from this tank into a cylinder 29 strapped to the frame 10 on the side opposite to tank 27 in which a piston operates, the rod 30 of which extends to the outside of the cylinder and has its end pivotally connected, as at 31, to the outer end of an arm 32, the inner end of which has attached thereto, as at 33, the united inner ends 34 of the brake operating arms 35, 36, the outer ends of which are secured to a crossbar 38 connecting links 37.

The inner ends of these links are secured or attached to the rear axle 13 of the automobile, while their outer ends carry ground engaging rollers or shoes 39.

The conduit 28 is controlled by a valve 40 adapted to be operated from a handle 41, by means of a lever 42, having both of its front arms 43, 44 engaging a cross-bar 45 the outer ends of which pass through one arm of brackets 46, 47 and are held in place behind said arms by means of nuts 49, 50 or the like. Through the other, angularly disposed arms of these brackets 46, 47 extend the inner ends of bars 51, 52 and carry nuts 53, 54 respectively.

The bars slide within casings 55, 56, from which their opposite ends project and are secured as at 57, 58 to the inner member 59 of a spring fender 60 to which the outer bent ends of member 59 are attached as illustrated in Figure 1 by the intermediary of blocks 61, 62 or the like.

The bars 51, 52 can also be made in two parts as illustrated in Figure 8, the movements of which are limited by means of lugs or blocks 63, 64 carried thereby, displaceably mounted in slots 65, 66 of casings 55, 56. The exhaust from cylinder 29 is returned through conduit 67 into tank 27, which conduit is controlled by a valve 68 the arm 69 of which is adapted to be operated by means of a lever arm 70 secured at its outer end to a member 71 having a hooked inner end 72 adapted to engage bar 45 as illustrated in Figure 1 and adapted to be operated by means of a lever 73 which is hollow and rotatable within a socket 74 on the frame 10, and the operation of which is effected by means of a handle 75.

Within the hollow lever 73 another bar 76 is rotatably mounted which at its upper end carries a handle 77 and which operates member 71 to swing the same out of and into engagement with bar 45, as the case may be.

In order to positively compress the air in tank 27 an auxiliary compression device is provided which comprises a worm 78 on shaft 18 in mesh with a worm wheel 79 on a shaft 80 journaled in suitable bearings 81, 82.

The shaft 80 is also journaled in bearings 83, 84 and is formed between these bearings into a crank 85 to which is secured one end of a piston-rod 86 attached to a piston working within cylinder 87, the rear end of which is connected to tank 27 by means of a conduit or pipe 88.

The shaft 18 is articulated at both of its ends, as at 89, 90, Figure 6, and carries as mentioned above the gear 17 in mesh with the small gear 16 on the motor shaft 15, and a lever 91 is pivoted to the forward end or extension 92 of shaft 18 between two collars 93, 94 thereon so that it may engage gear 17 with gear 16 or disengage both, as the case may be.

My device operates as follows:

If it is desired to operate the fan 22, the gear 16 is engaged with gear 17 by the proper operation of lever 91 to fill the tank 27 with air through conduit 26. Additional compression is provided by the operation of the auxiliary compressor pump 87 through pipe 88.

If a sufficient supply of compressed air is present in tank 27, as indicated for instance by suitably arranged indicators, shaft 18 is again disengaged from motor shaft 15 by the proper manipulation of lever 91.

If now it is desired to brake the vehicle, the proper operation of handle 77 by the intermediary of bar 71 will move bar 45 forward and open valve 40 to supply cylinder 29 with compressed air from tank 27 and drive the piston therein backwards to swing lever 32 with its end 33 to which the arms 35, 36 are secured in the opposite direction to lift the rear or drive wheels of the automobile above the ground by means of arms 37.

The exhaust of air from the tank 29 behind its piston 15 regulates by the proper operation of lever 75 operating valve 68 so that the exhaust is carried back into tank 27.

In the same manner, if the fender 60 strikes an obstacle in the path of the vehicle, the valves 40 and 68 will be operated by the intermediary of bar 45, arms 43, 44 and lever 70 to produce the same braking effect as heretofore described.

It will be understood that in this manner I have provided an efficient brake for automobiles working either by the operation of the usual brake lever or automatically if the fender of the car strikes an object and is pushed inwardly.

It is to be understood that I have shown and described the preferred form of my invention as one example only of the many ways to practically construct the same, and that I may make such changes as are covered by the scope of the appended claims without departure from my invention.

Having thus described my invention, what I claim as new and desire to secure by Letters Patent is:—

1. An automobile braking device comprising links for elevating the rear axle of the automobile, curved arms connected to said links, an arm to which the united ends of said curved arms are connected, a vertical shaft, a fan on said shaft, a casing for said fan, a bevel gear on said shaft outside of said casing, a horizontal shaft, a bevel gear on said horizontal shaft in mesh with the bevel gear on said vertical shaft, a means for coupling said horizontal shaft to the motor shaft of the vehicle, a compressed air tank, means for supplying said tank with a current of air generated by said fan, a means for supplying said tank with an auxiliary supply of compressed air, a cylinder, a valve controlled connection between said tank and said cylinder to operate the piston in said cylinder by compressed air from said tank, a valve controlled conduit for returning the exhaust of compressed air from said cylinder into said tank, a piston rod, connected to said arm connected to the united ends of said curved arms, a means for manually controlling the valve of the return conduit, a movable crossbar in the automobile frame controlling the supply valve for the compressed air to said cylinder, and a fender for operating said cross-bar when striking an obstacle in the path of the vehicle, to operate the braking links to lift the rear axle.

2. An automobile braking device comprising links for elevating the rear axle of the automobile, arms connected to said links, united at their ends, an arm to which the united ends of said arms are connected, a vertical shaft, a fan on said shaft, a bevel gear on said shaft, a horizontal shaft, a bevel gear on said horizontal shaft in mesh with the bevel gear on said vertical shaft, gears for coupling said horizontal shaft to the motor shaft of the vehicle, a compressed air tank, an air duct for supplying said tank with a current of air generated by said fan, an auxiliary compressor pump and conduit therefor for supplying said tank with an auxiliary supply of compressed air, means for disengaging said gears if the tank has received a sufficient supply of compressed air, a cylinder, a conduit for returning the exhaust of compressed air from said cylinder into said tank, a valve for controlling said conduit, a piston rod connected to the arm connected to the united ends of the link connecting arms, a movable cross-bar in the automobile frame controlling the supply valve for the compressed air to said cylinder, and a fender for operating said cross-bar when striking an obstacle in the path of the vehicle, to operate the links for lifting the rear axle.

Signed at Brooklyn, in the county of Kings and State of New York, this 23rd day of March, A. D. 1928.

JOHN MORTKA.